(12) United States Patent  
Wetzel et al.

(10) Patent No.: US 11,654,751 B2
(45) Date of Patent: May 23, 2023

(54) LAMINATED VEHICLE GLASS

(71) Applicant: Dr. Ing. h.c. F. Porsche Aktiengesellschaft, Stuttgart (DE)

(72) Inventors: Stephan Wetzel, Weissach (DE); Markus Alexander Bauer, Heusenstamm (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 642 days.

(21) Appl. No.: 16/837,170

(22) Filed: Apr. 1, 2020

(65) Prior Publication Data
US 2020/0324627 A1 Oct. 15, 2020

(30) Foreign Application Priority Data

Apr. 11, 2019 (DE) .................. 10 2019 109 578.6

(51) Int. Cl.
| | | |
|---|---|---|
| B32B 15/04 | (2006.01) | |
| B32B 17/06 | (2006.01) | |
| B60J 1/20 | (2006.01) | |
| B62D 25/06 | (2006.01) | |
| B41M 1/34 | (2006.01) | |
| B32B 17/10 | (2006.01) | |
| B60J 7/043 | (2006.01) | |
| B41M 1/10 | (2006.01) | |
| B41M 1/12 | (2006.01) | |
| B41M 1/26 | (2006.01) | |

(52) U.S. Cl.
CPC ....... B60J 1/2011 (2013.01); B32B 17/10036 (2013.01); B32B 17/10256 (2013.01); B32B 17/10651 (2013.01); B41M 1/34 (2013.01); B62D 25/06 (2013.01); B32B 2307/404 (2013.01); B32B 2605/00 (2013.01); B41M 1/10 (2013.01); B41M 1/12 (2013.01); B41M 1/26 (2013.01); B60J 7/043 (2013.01)

(58) Field of Classification Search
CPC ................... B32B 17/10036; B32B 17/10651
USPC ........................ 428/428, 432, 210
See application file for complete search history.

(56) References Cited

U.S. PATENT DOCUMENTS 4,634,231 A * 1/1987 Poncelet ............. C03C 17/3411
                                                           359/885
5,193,457 A * 3/1993 Hahn ........................ B60J 1/20
                                                           101/127

(Continued)

FOREIGN PATENT DOCUMENTS

DE    4020972 C1    6/1991
DE    4311049 C1    6/1994

*Primary Examiner* — Lauren R Colgan
(74) *Attorney, Agent, or Firm* — RatnerPrestia

(57) ABSTRACT

A laminated vehicle glass has an outer glass, an intermediate layer arrangement, an inner glass, a first color carrier and a second color carrier. The outer glass is at least partly adhesively bonded to the inner glass via the intermediate layer arrangement. The first color carrier is formed as a print with a first printing ink on the inner side of the outer glass. The second color carrier is formed as a print with a printing ink or as a film and has a second color. The second color carrier is provided in at least some regions on the side of the first color carrier that faces away from the outer glass. The first color and second color are different, at least in some regions. The second color is provided in a frame-like region of the laminated vehicle glass.

14 Claims, 4 Drawing Sheets

(56) References Cited

U.S. PATENT DOCUMENTS

Figure 1:
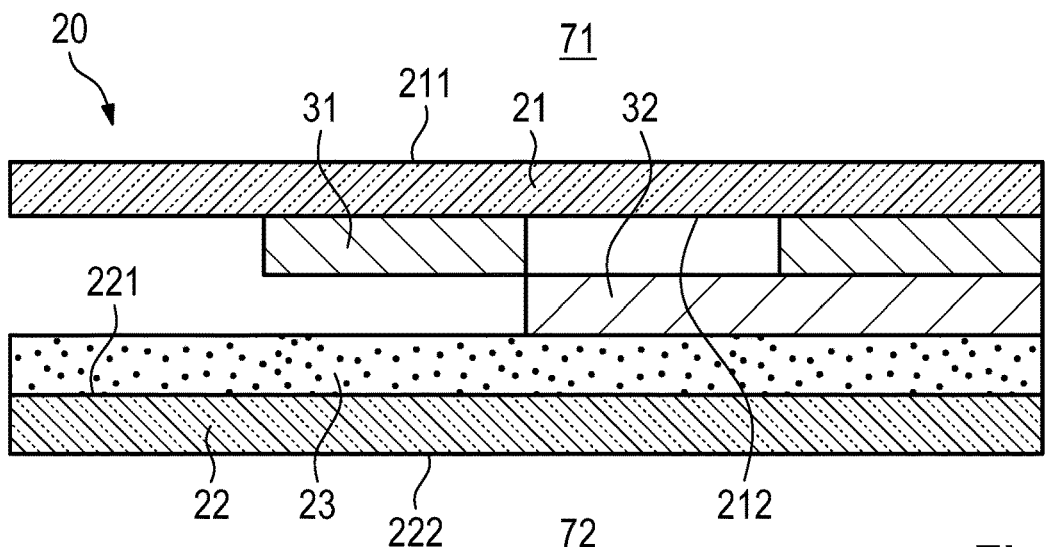

| | | | | |
|---|---|---|---|---|
| 5,284,376 | A * | 2/1994 | Zweigart | B60J 3/007 |
| | | | | 296/96.19 |
| 5,324,568 | A * | 6/1994 | Coninx | B60J 7/00 |
| | | | | 52/307 |
| 5,914,178 | A * | 6/1999 | Sol | B32B 17/10761 |
| | | | | 351/44 |
| 6,299,940 | B1 * | 10/2001 | Rapp | C03C 17/002 |
| | | | | 427/372.2 |
| 6,538,192 | B1 * | 3/2003 | Coster | B32B 17/10761 |
| | | | | 428/441 |
| 8,382,200 | B2 * | 2/2013 | Mathes | B60J 3/06 |
| | | | | 296/214 |
| 9,403,346 | B2 * | 8/2016 | Reynolds | B41M 5/52 |
| 9,776,478 | B2 * | 10/2017 | Dryselius | G02F 1/13306 |
| 9,802,401 | B2 * | 10/2017 | Li | G06F 3/041 |
| 2004/0234735 | A1 * | 11/2004 | Reynolds | B32B 17/1077 |
| | | | | 156/100 |
| 2008/0302258 | A1 * | 12/2008 | Zhang | H05K 3/1225 |
| | | | | 101/128.4 |
| 2012/0132245 | A1 * | 5/2012 | Kim | B60J 1/00 |
| | | | | 136/244 |
| 2015/0251381 | A1 * | 9/2015 | Van Duffel | B32B 17/10779 |
| | | | | 428/203 |
| 2018/0297515 | A1 * | 10/2018 | Laluet | B32B 17/10788 |
| 2019/0030865 | A1 * | 1/2019 | Aoki | B32B 3/02 |
| 2019/0207046 | A1 * | 7/2019 | de Bie | H01L 31/0488 |
| 2020/0171800 | A1 * | 6/2020 | Cleary | B32B 17/10266 |
| 2020/0276891 | A1 * | 9/2020 | van Doleweerd | |
| | | | | B32B 17/10541 |

* cited by examiner

LAMINATED VEHICLE GLASS

CROSS-REFERENCE TO RELATED APPLICATION

This application claims priority to German Patent Application No. 10 2019 109 578.6, filed Apr. 11, 2019, the content of such application being incorporated by reference herein in its entirety.

FIELD OF THE INVENTION

The invention relates to a laminated vehicle glass.

BACKGROUND OF THE INVENTION

DE 43 11 049 C1, which is incorporated by reference herein, shows a vehicle roof with a glass cover and a sunshade firmly attached to the inner side (212), which has a row of uniformly spaced light apertures. By means of screen printing, a color layer is applied, which simultaneously forms the sunshade and a peripheral decorative frame flush with the edge.

DE 40 20 972 C1, which is incorporated by reference herein, shows a method for printing a glass pane with a peripheral decorative frame flush with the edge by using a screen printing method in two printing operations, in which two L-shaped partial areas of the decorative frame that are complementary to each other are printed one after the other. The two mutually complementary L-shaped partial areas of the decorative frame overlap each other by a predefined extent which corresponds to the area tolerances of the glass pane.

SUMMARY OF THE INVENTION

A laminated vehicle glass has an outer glass, an intermediate layer arrangement, an inner glass, a first color carrier and a second color carrier, which outer glass is at least partly adhesively bonded to the inner glass via the intermediate layer arrangement, which first color carrier is formed as a print with a first printing ink on the inner side of the outer glass, which second color carrier is formed as a print with a printing ink or as a film and has a second color, which second color carrier is provided in at least some regions on the side of the first color carrier that faces away from the outer glass, which first color and second color are different, at least in some regions, and which second color is provided in a frame-like region of the laminated vehicle glass.

As a result of providing the first color carrier and the second color carrier, two different technical aspects can advantageously be achieved. The first color carrier permits a light-reducing but partly transparent configuration of the laminated vehicle glass, and the second color carrier permits a covering in the outer region in order, for example, at least partly to conceal adhesive points or seals provided in this region. This solution is advantageously implemented with different colors of the first print and of the second print. By means of the chosen arrangement of the color carriers, the first color carrier is visible from outside, even in the frame-like region of the second color carrier, and the second color carrier can nevertheless cover and conceal the joints in the outer region well.

According to a preferred embodiment, the first color carrier extends both into the frame-like region of the second color and into an inner region of the laminated vehicle glass that is surrounded by the frame-like region of the second color. This permits a configuration of the first color carrier over the entire area or at least over a major part of the area of the outer glass.

According to a preferred embodiment, the first color carrier covers less than 50% of the inner region. In this way, the ambient light which may be available can penetrate well into the vehicle interior. This saves energy for illumination.

According to a preferred embodiment, the second color is at least partly black or grey. These colors permit good visual protection in the frame-like region.

According to a preferred embodiment, the first color has a chromatic color, white or grey. These colors permit, firstly, a configuration without complete absorption or reflection and, secondly, good contrast with the second color can be chosen, which visually allows the second color to move into the background.

According to a preferred embodiment, the first color is monochromatic.

According to a preferred embodiment, the second color is monochromatic.

The monochromatic configuration of the first and/or second color makes it easier to create a color that is reproducible in mass production.

According to a preferred embodiment, the first color carrier has annular regions, in particular with a polygonal or round outer contour. Providing annular regions visually effects the impression that a relatively large area is provided with the first color carrier, wherein the overall coverage of the laminated glass is nevertheless low.

According to a preferred embodiment, the inner region of the first outer glass that is surrounded by the frame-like region of the second color is formed as a visible region. The formation as a visible region is advantageous, since here the first print is easily visible and, as a result of the configuration, is able to protect the user against excessively intense solar irradiation.

According to a preferred embodiment, the first color carrier is baked into the outer glass. As a result of the baking, a stable connection between the glass and the print with long durability is made.

According to a preferred embodiment, the second color carrier is provided
- on the inner side of the outer glass,
- on the inner side of the inner glass that faces the outer glass, or
- on the outer side of the inner glass that faces away from the outer glass. These variants permit the desired visibility of the first and second color carrier from outside and from inside.

According to a preferred embodiment, the second color carrier is formed as a film, and the second color is formed as a print on the film or as a coloration of the film. These variants permit an easily reproducible design of the second color or of the contour of the second color.

According to a preferred embodiment, the second color carrier (32) is formed as a print on the outer glass (21) or the inner glass (22) and baked in. As a result of the baking, a permanent and stable connection between the second color carrier and the outer glass or inner glass can be achieved.

A vehicle has a glass roof, which glass roof has such a laminated vehicle glass. By means of the laminated vehicle glass, the glass roof with its aforementioned positive properties can be used in a vehicle. The glass roof can be provided as a fixed glass roof, removable glass roof or sliding glass roof.

BRIEF DESCRIPTION OF THE DRAWING FIGURES

Figure 2:
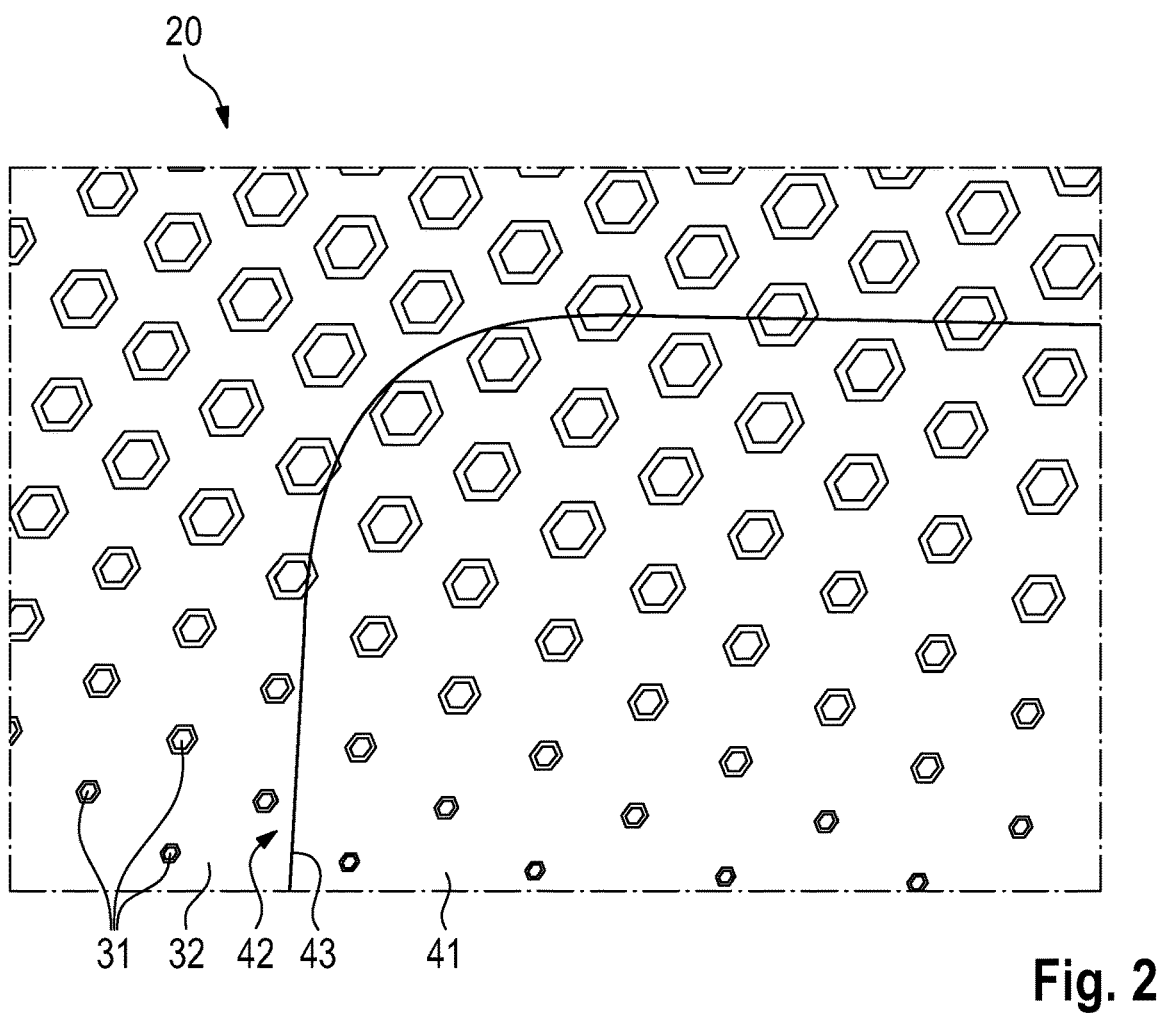
Figure 3:
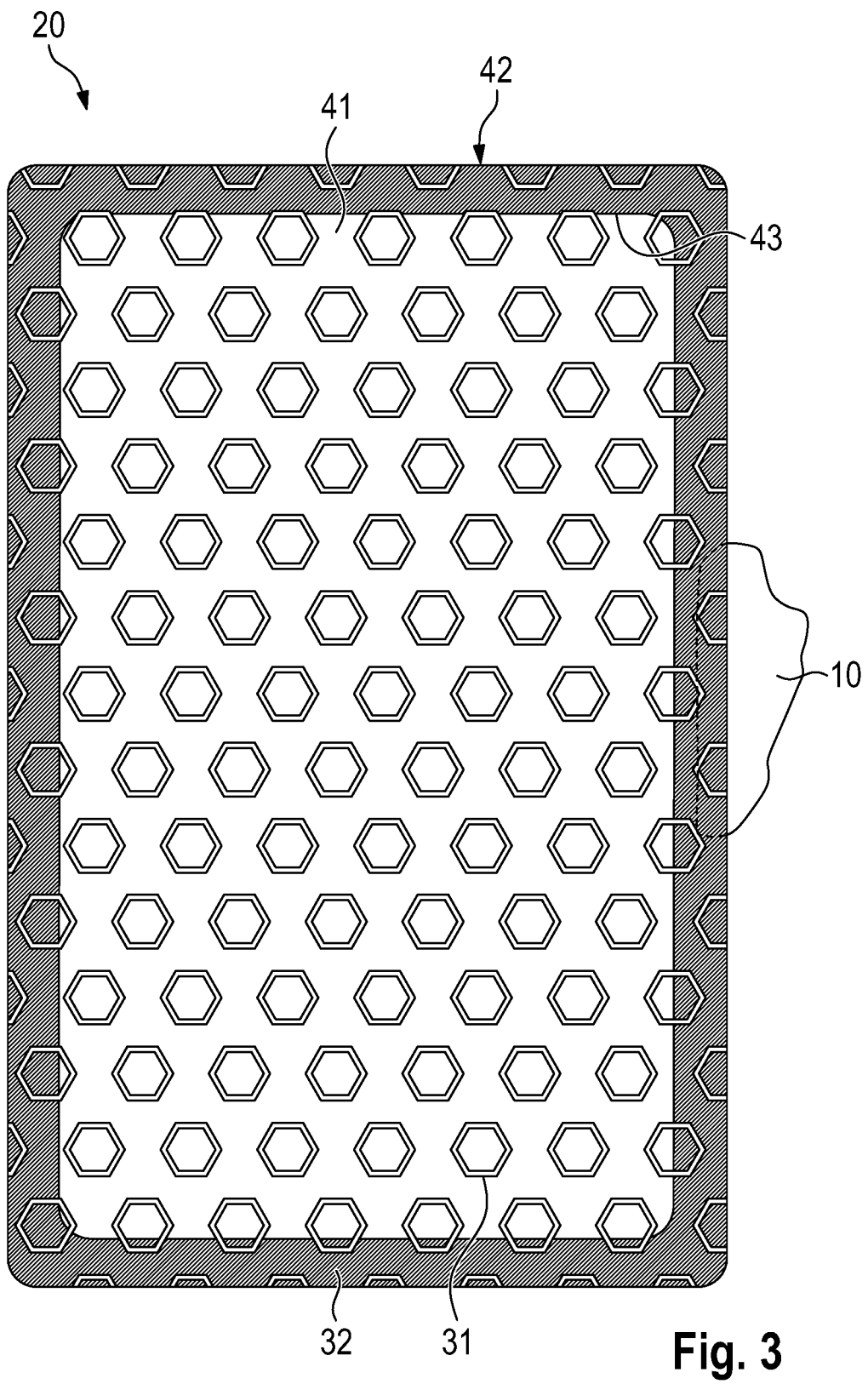
Figure 4:
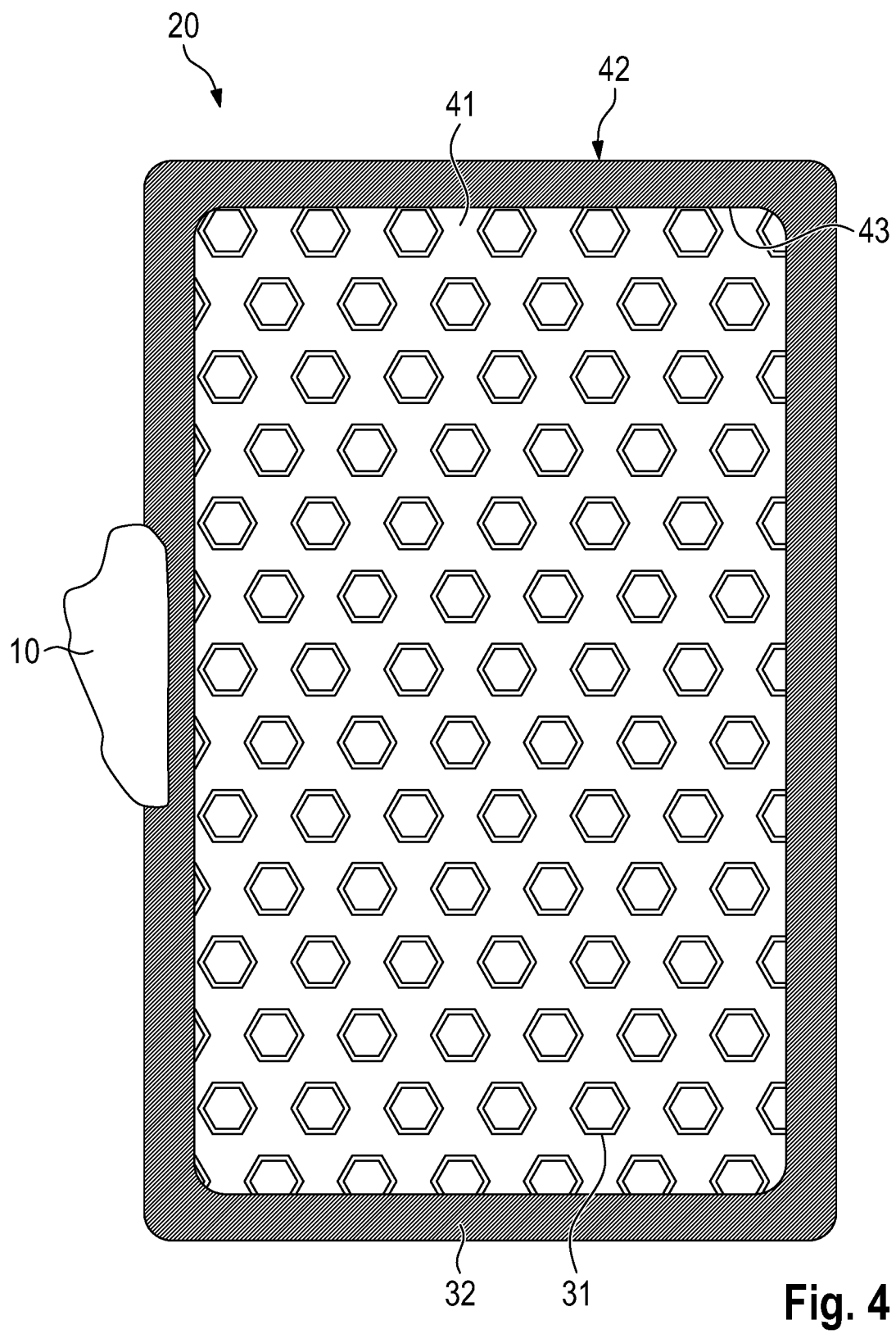
Figure 5:
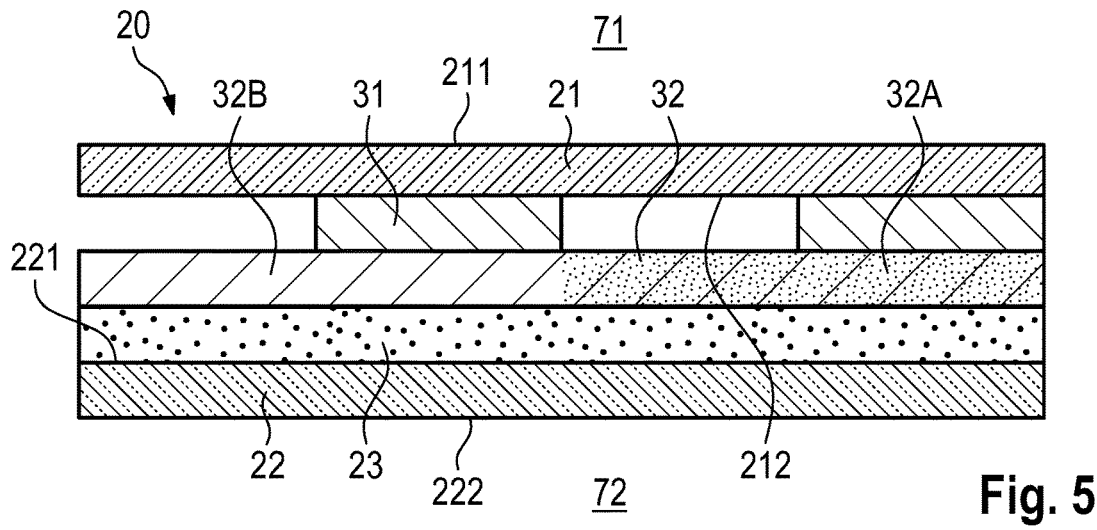
Figure 6:
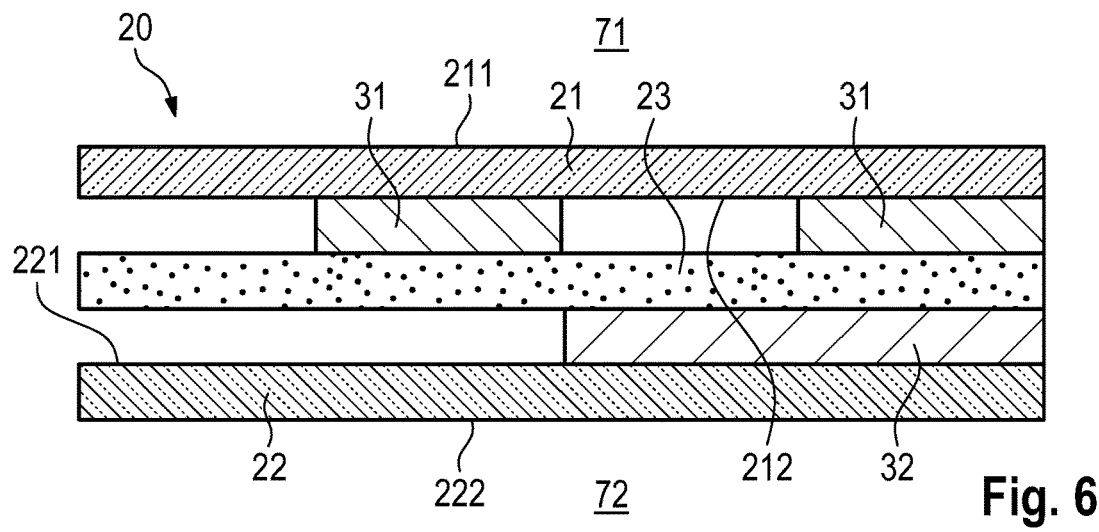
Figure 7:
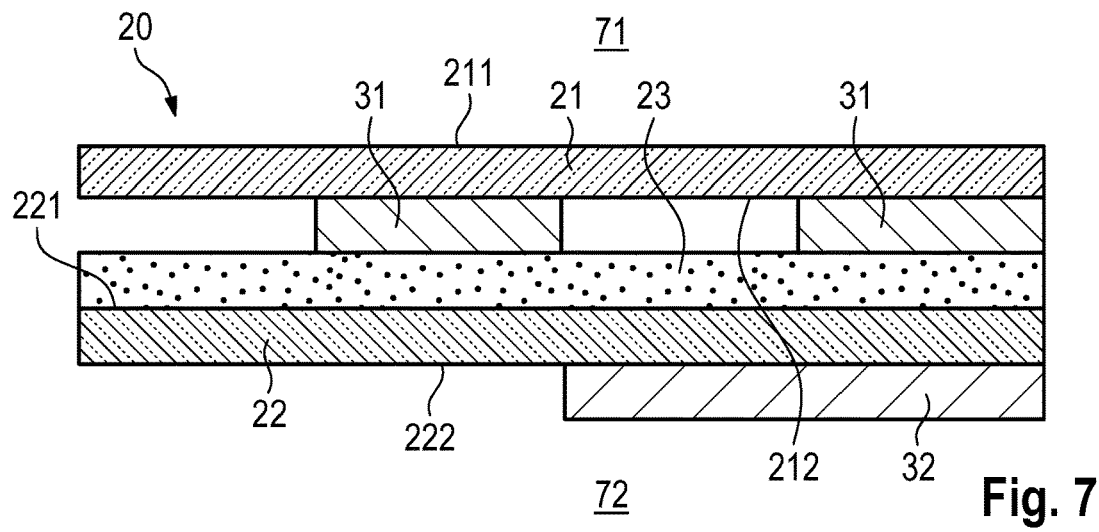

Further details and advantageous developments of the invention can be gathered from the exemplary embodiments described in the following and illustrated in the drawings, in no way to be understood as restricting the invention, and also from the dependent claims. In the drawings:

FIG. 1 shows a section through a laminated glass in a schematic illustration, FIG. 2 shows a region of the laminated glass from FIG. 1 in a plan view, FIG. 3 shows a first side of the laminated glass from FIG. 1 in a plan view, FIG. 4 shows a second side of the laminated glass from FIG. 3 in a plan view, FIG. 5 shows a section through a further embodiment of the laminated glass in a schematic illustration, FIG. 6 shows a section through a further embodiment of the laminated glass in a schematic illustration, and FIG. 7 shows a section through a further embodiment of the laminated glass in a schematic illustration.

DETAILED DESCRIPTION OF THE INVENTION

FIG. 1 shows a laminated glass 20, preferably a laminated vehicle glass. The structure of the laminated glass 20 is shown in a schematic illustration. The laminated glass 20 has an outer glass 21, an intermediate layer arrangement 23 and an inner glass 22. The outer glass 21 is at least partly adhesively bonded to the inner glass 22 via the intermediate layer arrangement 23.

The intermediate layer arrangement 23 comprises, for example, a layer of hot-melt adhesive. For example, the material PVB (polyvinyl butyral) is well suited. Films with thermoplastic (ionoplast) also exist. The intermediate layer arrangement 23 can also have multiple layers, for example a layer of hot-melt adhesive, a filter layer for specific wavelengths and a further layer of hot-melt adhesive.

The outer glass 21 has an outer side 211 and an inner side 212, and the inner glass 22 has an inner side 221 and an outer side 222. The terms inner side and outer side below thus relate to the laminated glass 20.

The outer glass 21 has a first color carrier 31 in some regions on the inner side 212. The first color carrier is formed as a first print with a first printing ink. The first print can, for example, be applied to the outer glass 21 by a screen printing method.

In addition to the first color carrier 31, a second color carrier 32 is provided, at least in some regions. The second color carrier 32 is formed as a second print with a second printing ink. The second color carrier 32 in the exemplary embodiment is at least partly applied to the first color carrier 31 in such a way that the first color carrier 31 is located between the outer glass 21 and the second color carrier 32, for example on the right-hand side of FIG. 1. The first printing ink has a first color and the second printing ink has a second color. The first color and the second color are different, at least in some regions.

If, in this application, mention is generally made of a color, all the colors including the colors black, white and grey are meant. Black, white and grey belong to the non-chromatic colors. Red and green belong, for example, to the chromatic colors.

The printing ink designates the colorant which, for example, is applied via a screen printing method or another method such as a spraying method, and the color designates the optical property of the colorant.

The first color is preferably a chromatic color, white or grey.

The second color is preferably at least partly black or grey. The second print is also designated a black print by those skilled in the art; the color can then be black or else another preferably highly covering and dark color.

Preferably, the first color and/or the second color are each monochromatic, in order to permit an easily reproducible color scheme. However, multicolored color gradients are also possible.

During the production, the first printing ink is preferably applied, a first drying process is then carried out, then the second printing ink is applied and a second drying process follows, and after that the first printing ink and the second printing ink are baked into the outer glass 21 by heating.

A first side 71 of the laminated glass 20 is assigned to the outer glass 21, and a second side 72 to the inner glass 22.

The layer structure shown is schematic. The intermediate layer arrangement 23 is usually thinner than the outer glass 21 and the inner glass 22, and the first color carrier 31 and second color carrier 32 are usually thinner than the intermediate layer arrangement. In addition, the second color carrier 32 preferably has contact with the outer glass 21 in some regions, at least at the points at which it is not attached to the first color carrier 31.

FIG. 2 shows by way of example a detail of a laminated glass 20 for a vehicle, seen from the side 71 from FIG. 1.

The second color carrier 32 is provided on the laminated glass 20 in a frame-like region 42, and the inner boundary of the frame-like region 42 is identified by a line 43. The inner region surrounded by the frame-like region 42 of the second color carrier 32 is identified by 41. The inner region 41 is preferably formed as a visible region; it is therefore located in a region visible by a driver or passenger.

The frame-like region 42 of the second color carrier 32 is preferably wholly or at least predominantly transparent, and this permits, firstly, optically a covering of an adhesive or peripheral foaming or sealing provided in the edge region of the laminated glass 20. Secondly, the second color carrier 32 also acts as a UV protector and therefore protects the joining agents (adhesive, peripheral foaming, sealing) for the connection of the laminated glass 20 to the vehicle.

The frame-like region 42 preferably forms a closed frame; however it can also be interrupted in specific regions if, for example, there is another covering in such a region.

Since the first color carrier 31 was applied before the second color carrier 32, in a plan view from the side of the outer glass the first color carrier 31 is also visible in regions in which both the first color carrier 31 and the second color carrier 32 are provided. This permits good visibility of the first color carrier 31 from the side 71 of FIG. 1. In this way, the first color carrier 31 can also be provided as a decorative print or decorative element and used as a stylistic element of the vehicle. A further advantage is that an adhesive, for example provided in the frame-like region 42 for connecting the laminated glass 20 to a body part is concealed better by the second color carrier 32 than by a possibly chromatic first color carrier 31.

FIG. 3 shows a further exemplary embodiment of the laminated glass 20 from the side 71 of FIG. 1. The first color carrier 31 has annular regions which, in the exemplary embodiment, are formed with a polygonal outer contour. Other annular regions with, for example, a round outer contour are also possible. Providing annular regions has the advantage that the percentage covering of the inner region 41 is low and thus a great deal of light can enter the vehicle interior. The first color carrier 31 is also visible in the frame-like region 42 of the second color carrier 32, since the second color carrier 32 is not located between the first color carrier 31 and the outer glass 21 (cf. FIG. 1).

In principle, technically barely any limits are placed on the design of the first color carrier 31, and the design can be allowed high priority.

A vehicle 10 is indicated schematically on the right-hand side of the laminated glass 20, and the laminated glass 20 is preferably used for the roof area of the vehicle 10. This is also designated a glass roof. It can be seen that the first color carrier 31 is visible from the outside of the vehicle 10 as far as the edge region of the laminated glass 20, and this results in positive design possibilities for the vehicle 10. A body part of the vehicle 10 and the laminated glass 20 overlap partly in the exemplary example.

FIG. 4 shows the laminated glass 20 from FIG. 3, seen from the side 72 of FIG. 1. The frame-like region 42 of the second color carrier 32 covers the first color carrier 31 in the edge region of the laminated glass 20, and in this way the edge region of the laminated glass 20 is masked out visually from being noticed, and an adhesive that may be present is not noticed.

As in FIG. 3, the vehicle 10 is indicated schematically, and the view of the laminated glass 20 corresponds to the view from the inner side of the vehicle 10. The first color carrier 31 permits the intensity of the incoming light to be influenced. The frame-like region 42 is provided at the edge of the laminated glass 20 and is only slightly noticeable from inside.

The body or another part of the vehicle 10 conceals an edge region of the laminated glass 20, as indicated schematically.

FIG. 5 shows a further exemplary embodiment of the laminated glass 20, in which the second color carrier 32 is formed as a film. The film 32 has a color indicated by small dots in a region 32A, and it is transparent in a region 32B (without dots). The color of the film 32 can, for example, be formed as a print on the film or as a coloration of the film. It is also possible to determine the contour of the second color or of the colored region by appropriate cutting of the film. In the region in which the first color carrier 31 and the second color carrier 32 are provided, the second color carrier 32 is provided on the side of the first color carrier 31 that faces away from the outer glass 21. As a result of providing the second color carrier 32 on the inner glass 22, in a respective configuration of the color carrier 31, 32 as a print, the first color carrier 31 and the second color carrier 32 can be baked in independently of each other.

With reference to the remaining constituent parts 21, 31, 23, 22, the exemplary embodiment preferably corresponds to the exemplary embodiment from FIG. 1.

FIG. 6 shows a further embodiment of the laminated glass 20. The second color carrier 32 is provided on the inner side 221 of the inner glass 22, facing the outer glass 21. The intermediate layer arrangement 23 is thus located between the first color carrier 31 and the second color carrier 32. The second color carrier 32 is in the interior of the laminated glass and, as a result, is protected against destruction by scratching the laminated vehicle glass 20. The remaining constituent parts 21, 31, 23 and 22 preferably correspond to those of the exemplary embodiment from FIG. 1.

FIG. 7 shows a further exemplary embodiment of the laminated glass 20. The second color carrier 32 is provided on the outer side 222 of the inner glass 22, facing away from the outer glass 21. In this way, too, the second color carrier 32 is at least partly provided on the side of the first color carrier 31 that faces away from the outer glass 21. In the normal case, the mechanical action on the laminated glass 20 is greater on the side of the outer glass 21 than on the side of the inner glass 22. Therefore, an attachment of the second color carrier 32 to the side 222 of the inner glass 22 is possible.

In the exemplary embodiments, the second color carrier 32 can in each case be formed as a print with a printing ink or as a film.

Of course, diverse variations and modifications are possible within the scope of the invention.

In the exemplary embodiments, the laminated glass 20 has a rectangular outline, possibly with or without rounded corners. However, other outlines, such as oval or round outlines, are also possible.

The second color carrier 32 can be provided over the entire area in the frame-like region but can also be provided wholly or partly as a dot matrix.

What is claimed:

1. A laminated vehicle glass comprising:
   an outer glass, an intermediate layer arrangement, an inner glass, a first color carrier and a second color carrier,
   said outer glass being at least partly adhesively bonded to the inner glass via the intermediate layer arrangement,
   said first color carrier including a first printing ink on an inner side of the outer glass and having a first color,
   said second color carrier including a printing ink or a film and having a second color, wherein said second color carrier is provided in at least some regions on a side of the first color carrier that faces away from the outer glass,
   wherein the first color and second color are different, at least in some regions, and which second color is provided in a frame region of the laminated vehicle glass.

2. The laminated vehicle glass as claimed in claim 1, wherein the first color carrier extends both into the frame region of the second color and also into an inner region of the laminated vehicle glass that is surrounded by the frame region of the second color.

3. The laminated vehicle glass as claimed in claim 2, wherein the first color carrier covers less than 50% of the inner region.

4. The laminated vehicle glass as claimed in claim 1, wherein the second color is at least partly black or grey.

5. The laminated vehicle glass as claimed in claim 1, wherein the first color has a chromatic color, white or grey.

6. The laminated vehicle glass as claimed in claim 1, wherein the first color is monochromatic.

7. The laminated vehicle glass as claimed in claim 1, wherein the second color is monochromatic.

8. The laminated vehicle glass as claimed in claim 1, wherein the first color carrier has annular regions with a polygonal or round outer contour.

9. The laminated vehicle glass as claimed in claim 1, wherein the inner region of the first outer glass that is surrounded by the frame region of the second color is formed as a visible region.

10. The laminated vehicle glass as claimed in claim 1, wherein the first color carrier is baked into the outer glass.

11. The laminated vehicle glass as claimed in claim 1, wherein the second color carrier is provided:
    (a) on the inner side of the outer glass,
    (b) on an inner side of the inner glass that faces the outer glass, or (c) on an outer side of the inner glass that faces away from the outer glass.

12. The laminated vehicle glass as claimed in claim 1, wherein the second color carrier is formed as a film, and the second color is formed as a print on the film or as a coloration of the film.

13. The laminated vehicle glass as claimed in claim 1, wherein the second color carrier is formed as a print on the outer glass or the inner glass and baked in.

14. A vehicle having a glass roof, which glass roof has the laminated vehicle glass as claimed in claim 1.

* * * * *